US005975826A

United States Patent [19]
Scholder

[11] Patent Number: 5,975,826
[45] Date of Patent: Nov. 2, 1999

[54] HAND-TRUCK WITH ATTACHMENTS

[76] Inventor: Perry L. Scholder, 1827 Burgundy Dr., Lodi, Calif. 95242

[21] Appl. No.: 09/040,349

[22] Filed: Mar. 17, 1998

[51] Int. Cl.⁶ .................................................. B62B 3/04
[52] U.S. Cl. ......................... 414/444; 414/490; 254/4 R
[58] Field of Search .................................. 414/444, 447, 414/450, 457, 490, 540, 542, 664, 665, 669; 280/47.18, 47.19, 47.2, 47.24; 254/4 R, 4 C

[56] References Cited

U.S. PATENT DOCUMENTS

| | | | |
|---|---|---|---|
| 3,578,353 | 5/1971 | Lockhart | 414/444 X |
| 3,582,043 | 6/1971 | Tranchero | 254/2 R |
| 3,704,799 | 12/1972 | Morris, Jr. | 414/444 |
| 3,896,904 | 7/1975 | Walker | 187/9 R |
| 3,951,286 | 4/1976 | Horst | 414/444 |
| 4,114,771 | 9/1978 | Heuckroth | 414/457 |
| 4,498,837 | 2/1985 | Kooi et al. | 414/664 |
| 4,737,065 | 4/1988 | Ju | 414/490 |
| 5,251,922 | 10/1993 | Mann | 414/490 X |
| 5,662,451 | 9/1997 | Muzzi et al. | 254/4 R X |
| 5,681,139 | 10/1997 | Szanto | 254/4 C X |

FOREIGN PATENT DOCUMENTS

| | | | |
|---|---|---|---|
| 6056396 | 3/1994 | Japan | 414/490 |
| 2202508 | 9/1988 | United Kingdom | 414/490 |
| 2269806 | 2/1994 | United Kingdom | 414/490 |
| 81/03482 | 12/1981 | WIPO | 414/664 |
| 92/13745 | 8/1992 | WIPO | 414/490 |

*Primary Examiner*—James W. Keenan

[57] ABSTRACT

A two-wheeled hand-truck with attachments, with an elevating mechanism incorporated into the body. The upright rails are tubular, and open on the bottom ends. A crank operated cable and pulley system forcibly extends the elevator downwardly. The attachments allow the body to be converted into a four wheel cart with a variable width wheelbase, and a crank operated, pulley assisted, fork lift, or hoist.

16 Claims, 10 Drawing Sheets

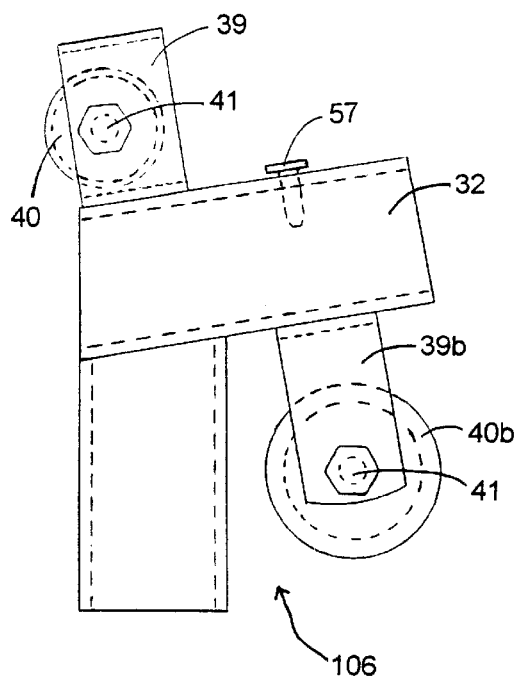 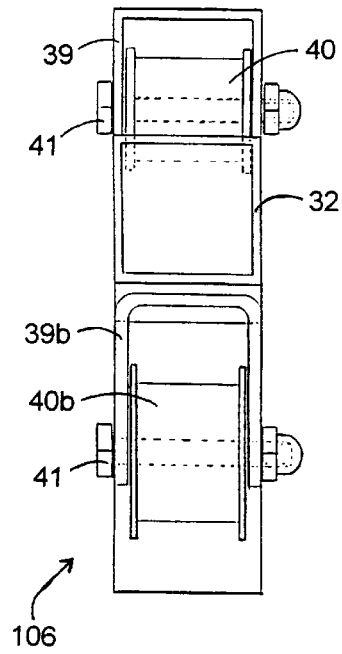 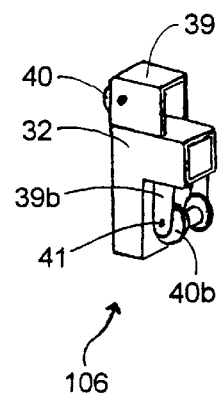
Fig.7  Fig.7A  Fig.7B
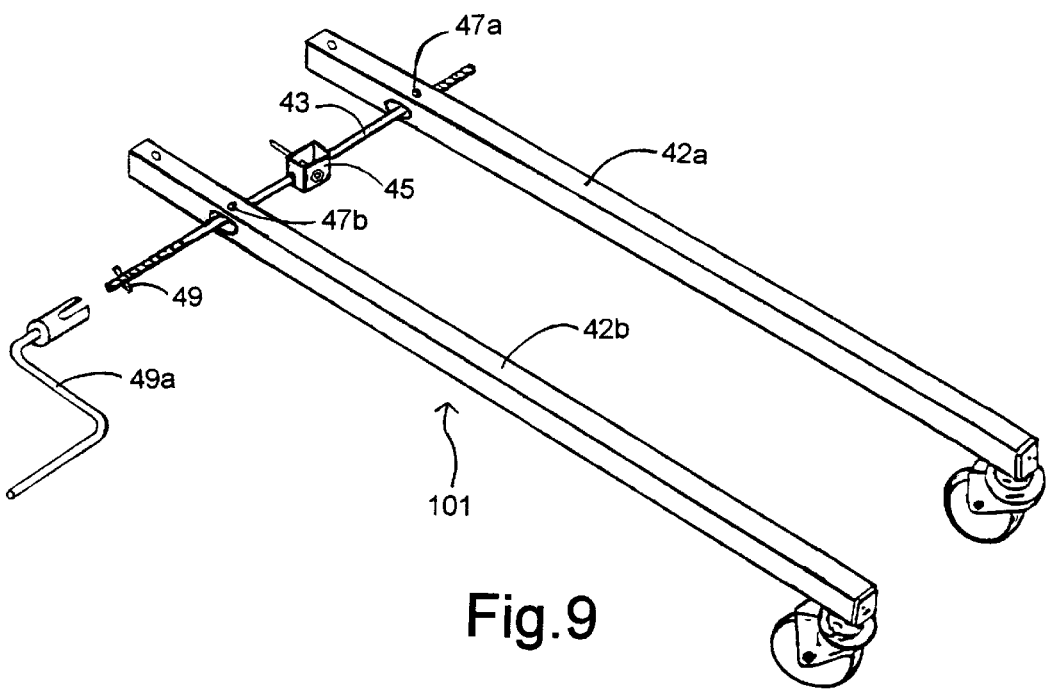
Fig.9

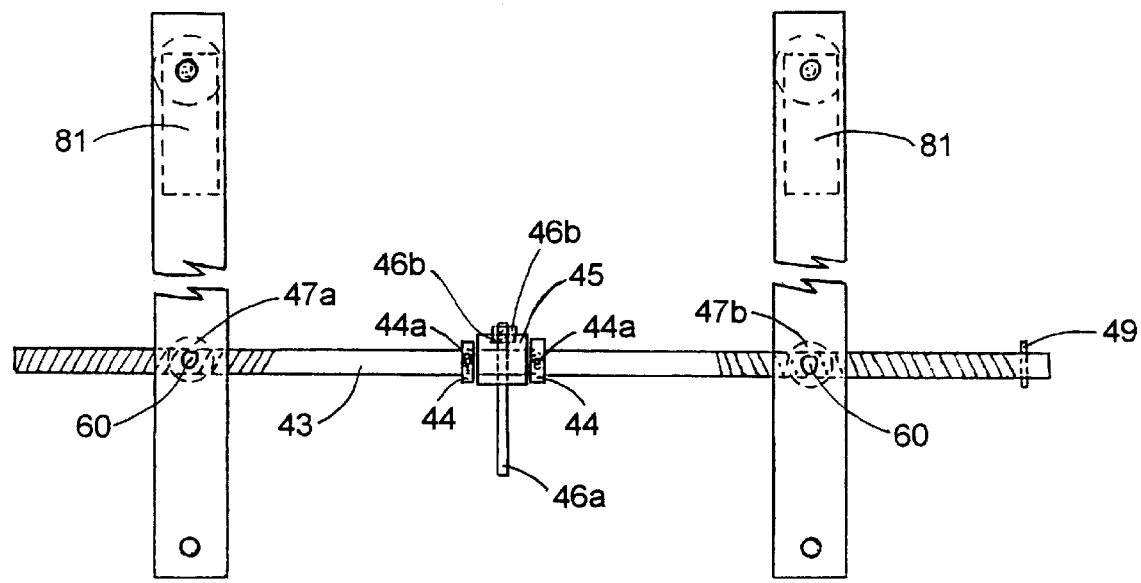
Fig.9A
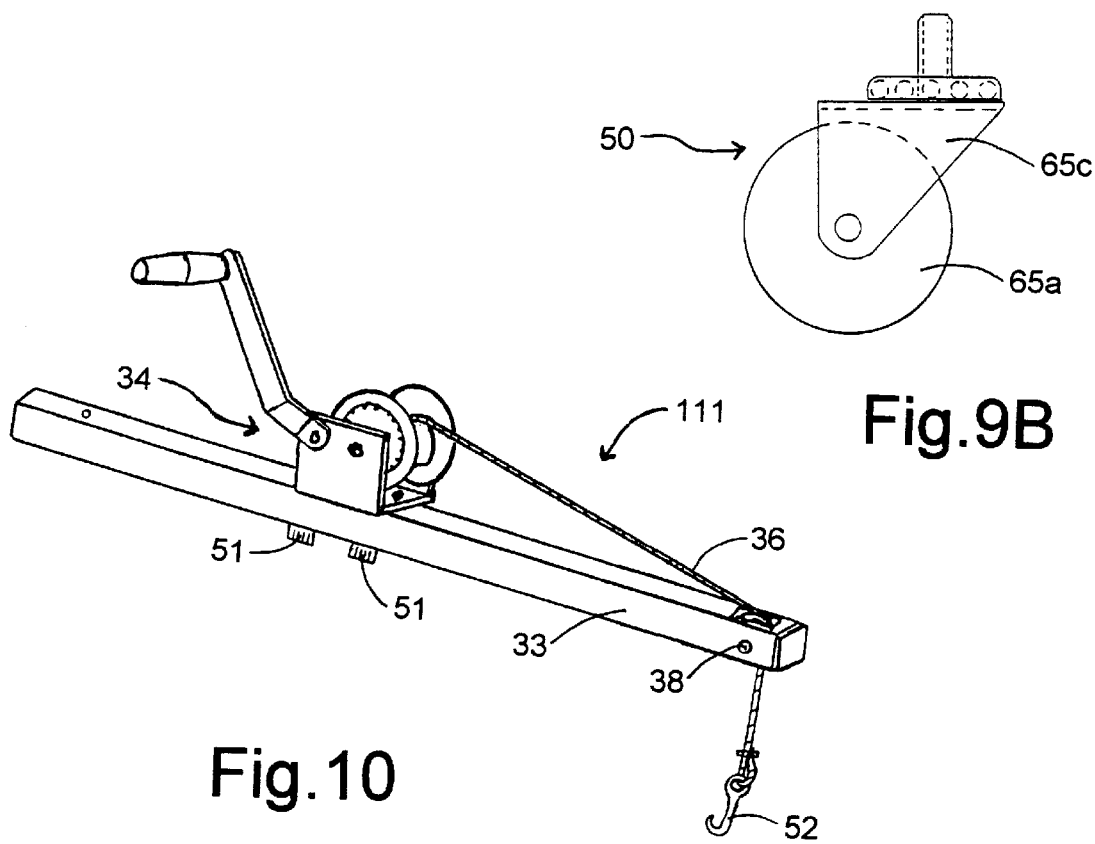
Fig.9B
Fig.10

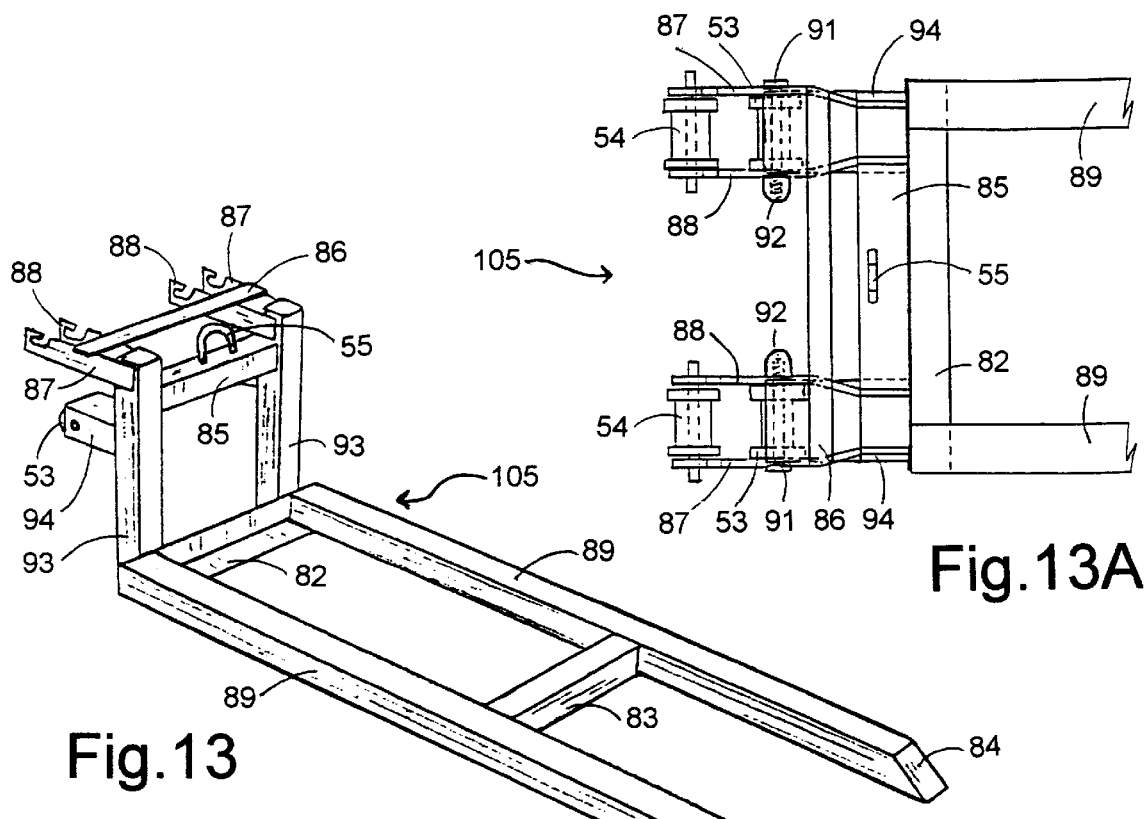
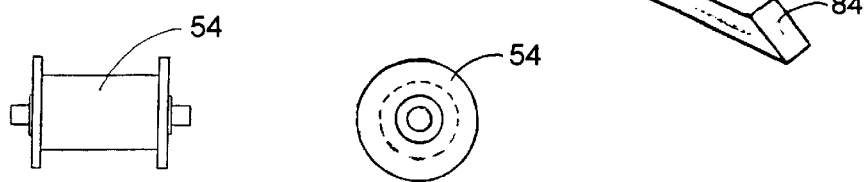
Fig.13
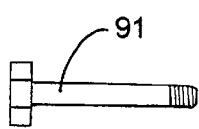
Fig.13C  Fig.13D
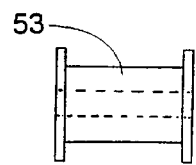 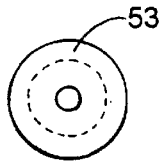
Fig.13E  Fig.13F  Fig.13G  Fig.13H

HAND-TRUCK WITH ATTACHMENTS

BACKGROUND—FIELD OF THE INVENTION

This invention relates to multipurpose hand-trucks, specifically to such hand-trucks used to haul, hoist, elevate, lift, and transport objects.

BACKGROUND—DESCRIPTION OF PRIOR ART

Hand-trucks are commonly used to move objects around on level surfaces without the operator having to expend much effort. There are some limitations to the standard hand-truck that my invention overcomes.

(a) One of the most common problems is confronted when it is necessary to change elevations. Some examples would be climbing stairs, or loading into a car, truck, or van. The "two-wheeled hand-truck with elevator" in U.S. Pat. No. 3,896,904 to Walker, Jul. 29, 1975, is limited to elevating an object that is seated on a single lifting platform, and cannot be used effectively to load into a car trunk, or a confined area, for example a small van, that does not allow the operator enough room to stand above, and behind the object to be lifted.

(b) The slotted formed sheet metal shape used in the Walker, 1975 patent is not as strong as tubing.

(c) An exposed chain is used to operate the elevating mechanism, because chains require oil to operate smoothly, they tend to collect dirt and spread dirty oil to anything they happen to come into contact with.

(d) When standing on a truck bed the crank to operate the elevating mechanism is approximately at knee level, this places the operator in a very awkward position to be in when handling a load.

(e) The handle does not allow the operator to balance the load in the middle with one hand, while turning the crank with the other. This off center grasp causes the load to tend to twist while it is being lifted.

(f) The crank that powers the elevating mechanism is not centeared on the unit, this causes the load to tend to twist and increases the difficulty of balancing the load, while cranking the handle.

(g) The handle is confining and narrow, and does not provide adequate leverage to easily maneuver the load.

OBJECTS AND ADVANTAGES

Accordingly, besides the advantages of the hand-truck described in the above patent, several objects and advantages of the present invention are:

(a) to provide an easily managed and well balanced method to elevate or lower the hand-truck and the load as a unit for example up or down stairs, or up and down from a truck bed;

(b) to provide a handle that is easily accessible;

(c) to provide a handle that may be grasped in the middle, which makes balancing the load easier while holding the handle with one hand and cranking the winch with the other hand;

(d) to provide a winch that is centered on the unit, which reduces the tendency of the load to twist when the crank is being turned;

(e) to provide variable winch locations, which can be changed to meet the requirements of any job, and avoid placing the operator in awkward and dangerous positions;

(f) to provide a clean and oil free fabric strap or a metal wire cable, to transfer the force to the elevating mechanism;

(g) to provide a hoist attachment that allows the load to be placed into a cavity for example a car trunk, or a van;

(h) to provide a hoist attachment which allows the load to be placed in high areas for example on a high shelf, or to stack the load;

(i) to provide a hoist attachment that may be used to lift objects from below ground level;

(j) to provide hoist and winch attachments that are adjustable in height;

(k) to provide a hoist attachment that is mobile and can be rolled while supporting a load;

(l) to provide a forklift attachment that can be used to lift and transport a load, for example loading a truck, van, station wagon, shelves, or for stacking items;

(m) to provide a four wheel cart attachment with a variable width wheel base, that can fit through narrow spaces, for example doorways, the front wheelbase can be widened to provide greater stability, or provide access to an object;

(n) to provide a four wheel cart attachment with a variable width wheel base, that can be loaded or unloaded by the hoist attachment, or the forklift attachment, and raised or lowered with the elevating mechanism;

(o) to provide that all of the above mentioned attachments may be installed or removed without the use of any tools;

Still further objects and advantages will become apparent from consideration of the ensuing description and drawings.

DRAWING FIGURES

In the drawings, closely related figures have the same number but different alphabetic suffixes.

FIG. 7 shows a (side view) engineering drawing of a boom support attachment.

FIG. 7A shows a (front view) engineering drawing of a boom support attachment.

FIG. 7B shows a perspective view of a boom support attachment.

FIG. 9 shows a perspective view of a divergent leg attachment.

FIG. 9A shows a engineering drawing (top view) of a divergent leg attachment.

FIG. 9B shows a engineering drawing (side view) of a caster assembly.

FIG. 10 shows a perspective view of a load lifting attachment.

FIG. 13 shows a perspective view of a load supporting attachment.

FIG. 13A shows a partial (top view) engineering drawing of a load supporting attachment.

FIG. 13C shows a (top view) engineering drawing of a attaching roller unit.

FIG. 13D shows an (end view) engineering drawing of an attaching roller unit.

FIG. 13E shows a (top view) engineering drawing of a roller bolt.

FIG. 13F shows a (top view) engineering drawing of a roller nut.

FIG. 13G shows a (top view) engineering drawing of a guide roller unit.

FIG. 13H shows an (end view) engineering drawing of a guide roller unit.

REFERENCE NUMERALS IN DRAWING

Figure 1:
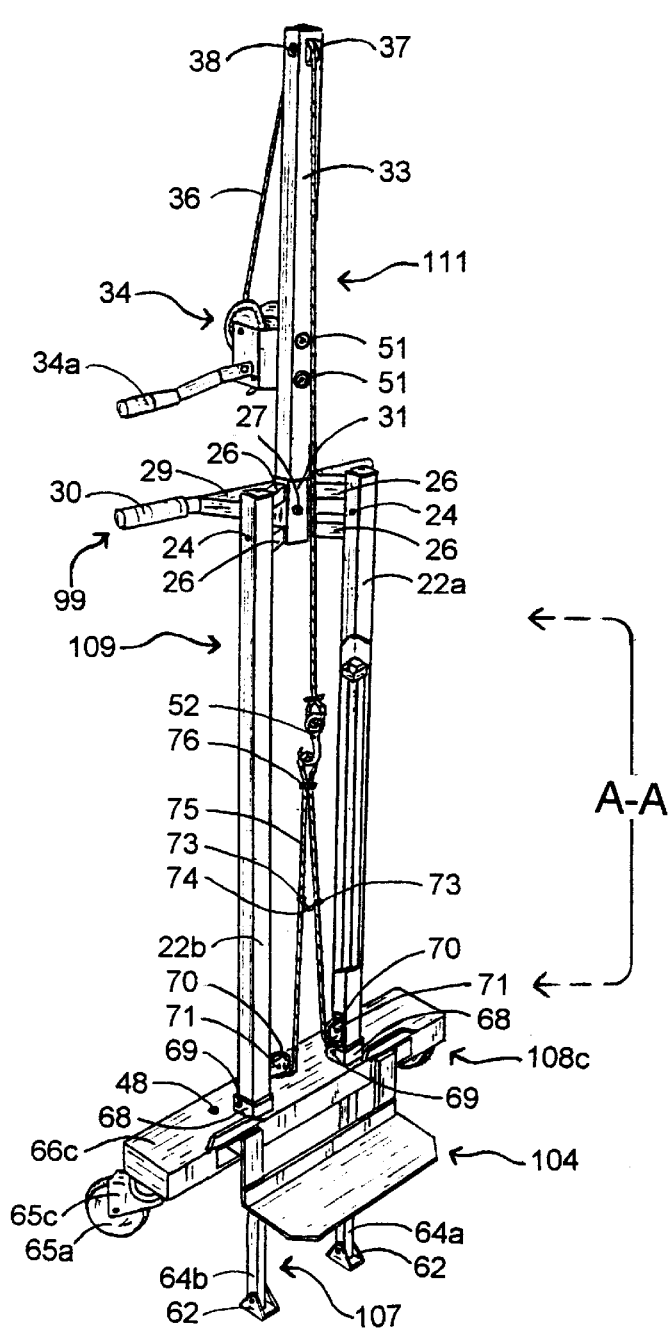
FIG. 1 shows a perspective view of a possible configuration of the hand-truck attachments.

| 21 | vertical rail | 22a | right longitudinally extended rail |
| 22b | left longitudinally extended rail | 24 | top spring pin |
| 23 | bottom spring pin | 26 | cross bar |
| 25 | elevator return spring | 28 | handle support bar |
| 27 | extension pin | 30 | handle grip |
| 29 | handle bar | 32 | horizontal boom support |
| 31 | vertical extension guide | 34 | winch unit |
| 33 | attachable rail | 34a | winch handle |
| 34b | mounting bolt | 36 | line |
| 35 | fabric strap | 38 | boom pin |
| 37 | pulley | 40 | top hoist pulley |
| 39 | top hoist pulley bracket | 40b | bottom hoist pulley |
| 39a | bottom hoist pulley bracket | 42b | left horizontally extended rail |
| 41 | pin | 43a | lead screw crank |
| 42a | right horizontally extended rail | 44a | set screw |
| 43 | lead screw | 45a | case unit |
| 44 | collar | 46b | lock nut |
| 45 | case | 47b | RH thread adjustment nut |
| 46a | stabilizer pin | 49 | crank stop pin |
| 47a | LH thread adjustment nut | 50 | caster assembly |
| 48 | base pin | 52 | hook |
| 49a | lead screw crank | 54 | attaching roller unit |
| 51 | threaded knob | 56 | rotatable wheel |
| 53 | guide roller unit | 60 | lock screw |
| 55 | u-bolt | 62 | foot |
|  |  | 63f | end plate fixed |

-continued

| 57 | boom pin | 64b | right inner rail |
| 63c | end plate caster | 65c | positional bracket |
| 64a | left inner rail | 66f | base body fixed |
| 65a | ground engaging wheel | 68 | parallel rail support |
| 66c | base | 70 | elevator pulley |
| 67 | base support | 72 | elevator pulley pin |
| 69 | parallel rail pin | 74 | elevator cross clamp |
| 71 | elevator pulley bracket | 76 | top elevator cable clamp |
| 73 | elevator cross cable clamp | 78 | bolt |
| 75 | elevator cable | 80 | plate |
| 77 | foot pin | 82 | angle bar |
| 79 | nut | 84 | slide plate |
| 81 | mount plate | 86 | upper support |
| 83 | lower crossmember | 88 | left roller bracket |
| 85 | upper crossmember | 91 | roller bolt |
| 89 | connected rail | 92 | roller nut |
| 87 | right roller bracket | 94 | roller case |
| 93 | riser | 96 | rail shim outer |
| 95 | rail shim back | 98 | rail shim front |
| 97 | rail shim slotted | 100 | lip plate |
| 99 | handle unit | 102 | mount bar |
| 101 | divergent leg attachment | 104 | transverse pick-up lip attachment |
| 103 | riser bar |  |  |
| 105 | load supporting mechanism | 108c | base attachment caster |
| 106 | boom support assembly | 108f | base attachment fixed |
| 107 | elevating mechanism | 110 | angle bar |
| 109 | body unit | 115 | thin shim front |
| 111 | load lifting mechanism | 116 | thin shim outer |
| 117 | thick shim back | 118 | thick shim inner |
| 119 | cable set screw | 120 | clamp bolt |
| 121 | vertical slot |  |  |

SUMMARY

In accordance with the present invention comprises a two-wheeled hand-truck with attachments, with an elevating mechanism incorporated into the body. The attachments enable the body to be converted into a four wheel cart with a variable width wheelbase, and a crank operated, and pulley assisted, fork lift, or a hoist.

Descriptions—FIGS. 1 to 16

A typical embodiment of the hand-truck of the present invention is illustrated in FIG. 1 prospective view and 1A enlarged sectional view. The main body and the attachments consist of steel, unless otherwise designated, however they can consist of other materials, such as aluminum, various metals, polyethylene, polypropylene, various impregnated or laminated fibrous materials, various plasticized materials, etc.

Figure 6:
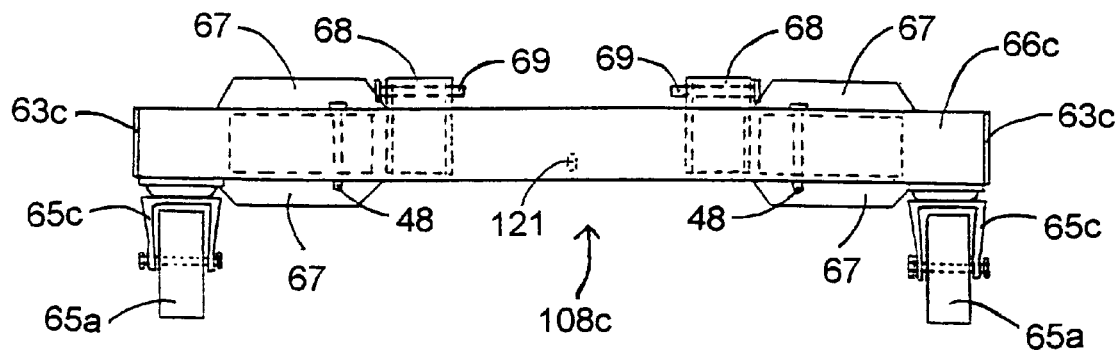
FIG. 6 shows an engineering drawing (back view) a base attachment having position locking caster wheels.
Figure 6A:
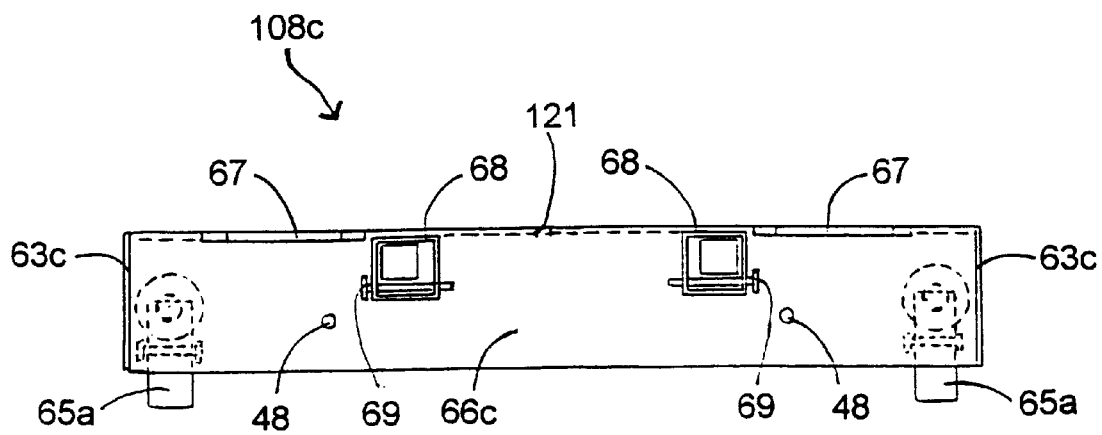
FIG. 6A shows an engineering drawing (top view) a base attachment having position locking caster wheels.

A base 66c FIG. 6 and FIG. 6A consisting of rectangular tubing of approximately 2.5 mm wall thickness, approximately 5.08 cm×10.16 cm×61 cm long. A end plate caster 63c FIG. 6 approximately 3 mm thick the size of the end of the tubing is attached over each end of the base 66c. A ground engaging wheel 65a FIG. 6 consisting of a rotatable wheel is attached to a positional bracket 65c FIG. 6 consisting of a caster wheel bracket that is connected to the bottom of the base 66c at each end. A parallel rail support 68 FIG. 6 consisting of tubing 45 mm square×7 mm wall×75 mm long having a 9.4 mm hole offset toward the back in line through two walls near the top end is connected into a hole in the top of base 66c.

Figure 14A:
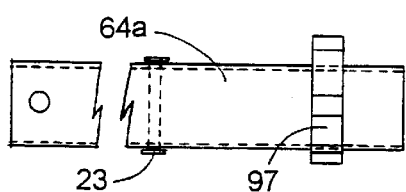
FIG. 14A shows a (left side view) engineering drawing of a right inner rail.
Figure 14B:
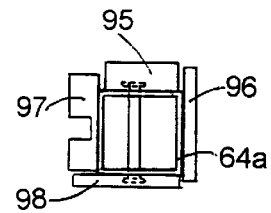
FIG. 14B shows a (bottom end view) engineering drawing of a right inner rail.
Figure 14C:
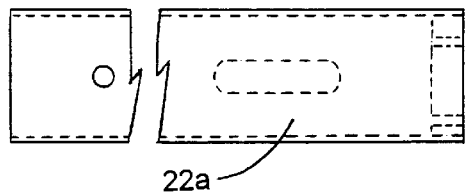
FIG. 14C shows a (left side view) engineering drawing of a right longitudinally extended rail.
Figure 14D:
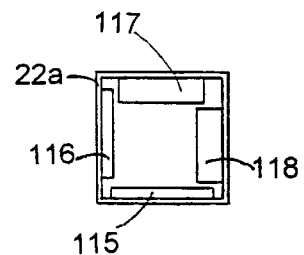
FIG. 14D shows a (bottom end view) engineering drawing of a right longitudinally extended rail.

A right longitudinally extended rail 22a FIG. 14C and FIG. 14D consisting of tubing 38 mm square×122 cm long. Having a slot 45.7×13.5 through the inner wall located in the center of the tubing approximately 94 mm from the bottom. Having a 6 mm hole in line through the inner and outer walls centered 50 mm from the top. Having a thin shim 115 consisting of steel 12 mm×4.75 mm×25 mm connected inside the front wall horizontally along the bottom. Having a thin shim outer 116 consisting of steel 12 mm×4.75 mm×25 mm connected inside the outer wall horizontally along the bottom. Having a thick shim back 117 consisting of steel 12mm×10.1 mm×23 mm connected inside the back wall horizontally along the bottom. Having a thick shim inner 118 consisting of steel 12 mm×10.1 mm×23 mm connected inside the inner wall horizontally along the bottom.

Figure 11:
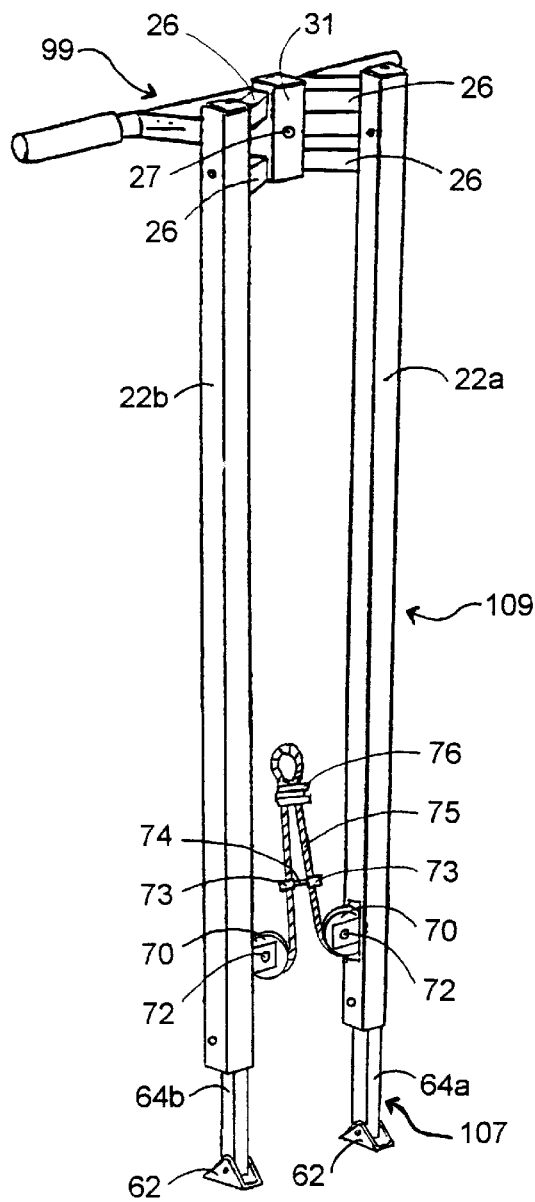
FIG. 11 shows a perspective view of a body unit attachment.

A left longitudinally extended rail 22b FIG. 11 consisting of a mirror image of rail 22a. Said rail 22a and rail 22b are slipped into the parallel rail supports extending upward. Rail 22a and rail 22b are each attached to support 68 with a parallel rail pin 69 FIG. 5 and FIG. 6A consisting of steel approximately 9.4 mm diameter×7.5 cm long. A cross bar 26 FIG. 11 consisting of steel tubing approximately 32 mm square×96 mm long having parallel ends chamfered 30 degrees is used in two places connected between rail 22a and a vertical extension guide 31 FIG. 11 consisting of 44.5 mm square tubing 100 mm long having a 9.4 mm hole centered through the front and back walls in line. A cross bar 26 is used in two places connected between rail 22b and the guide 31.

Figure 15:
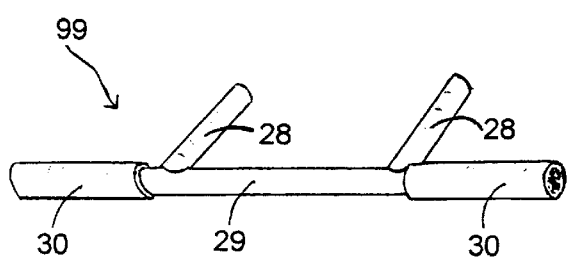
FIG. 15 shows a perspective view of a handle unit.

A handle unit 99 FIG. 15 having a handle bar 29 consisting of steel tubing 25 mm diameter×535 mm long. Having a handle support bar 28 consisting of steel tubing 25 mm diameter×125 mm having a 7 degree angle on one end and a 25 mm concave radius 12 mm deep in the opposite end. Having the concave end of each bar 28 attached to the said handle bar 29 150 mm from each end. Having a handle grip 30 consisting of a plasticized hand grip fits on bar 29 on each end. Said handle unit 99 is attached near the top of rail 22a and rail 22b at the 7 degree angle. A attachable rail 33 FIG. 10 consisting of tubing having a through slot at one end with a hole centered to the slot on the adjacent side. Having two 9.5 mm holes in line centered through both walls 75 mm apart parallel to said slot beginning 220 mm from end opposite said slot. Having one 9.5 mm hole in line centered through both walls parallel to said slot beginning 30 mm from end opposite said slot. Rail 33 is slipped into guide 31 and secured in place by a extension pin 27 FIG. 11 consisting of steel approximately 9.4 mm diameter×7.5 cm long.

Figure 16:
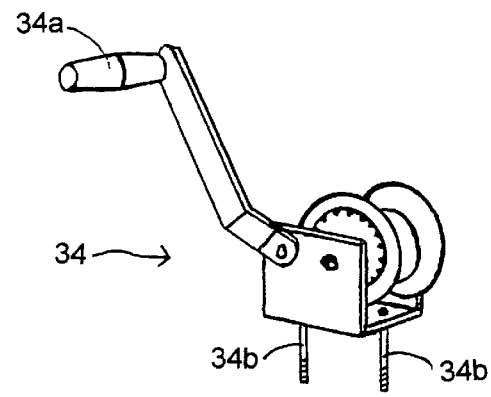
FIG. 16 shows a perspective view of a winch unit.

A winch unit 34 FIG. 16 consisting of a winch with a hand crank, safety lock, and a mounting bolt 34b consisting of 9.4 mm bolts×55 mm long in two places, and a handle 34a consisting of a common winch handle is attached to the rail 33. Using a threaded knob 51 FIG. 10 consisting of a hand tightening threaded knob two places. A pulley 37 FIG. 10 consisting of a pulley approximately 5.5 cm diameter×4.5 cm wide is attached in a slot through rail 33 using a boom pin 38 FIG. 10 consisting of steel approximately 9.4 mm diameter×6.5 cm long. A line 36 FIG. 10 consisting of steel cable or fabric strap having a hook 52 FIG. 10 consisting of a common steel hook attached to the end is extended from winch 34 and over pulley 37 then down through rail 33 and hooked to a elevator cable 75 FIG. 11 consisting of steel cable approximately 5 mm diameter.

Figure 11A:
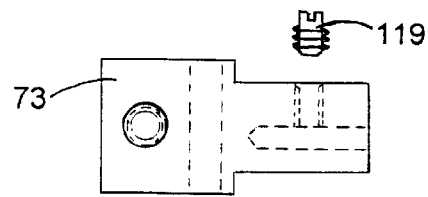
FIG. 11A shows an engineering drawing (front view) of a elevator cross cable clamp.
Figure 11B:
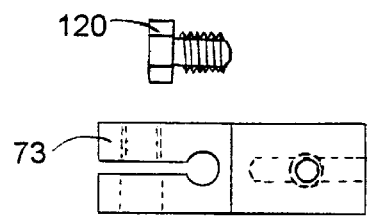
FIG. 11B shows an engineering drawing (top view) of a elevator cross cable clamp.

A top elevator clamp 76 FIG. 11 consisting of a cable clamp is clamped to cable 75. A elevator cross cable clamp 73 FIG. 11A and FIG. 11B consisting of a metal block having a hole large enough to allow cable 75 to fit through it. Having a slot parallel to the hole, the slot having a bolt hole threaded at one end through it to allow a clamp bolt 120 consisting of a 6 mm bolt to close the slot thereby clamping the clamp 73 to the cable 75. Having a hole perpendicular to said hole large enough to allow a elevator cross cable 74 consisting of cable 100 mm long to fit in it being secured there with a cable set screw 119 consisting of a 6 mm screw. Each clamp 73 is connected to cable 75 in on each side.

Figure 1A:
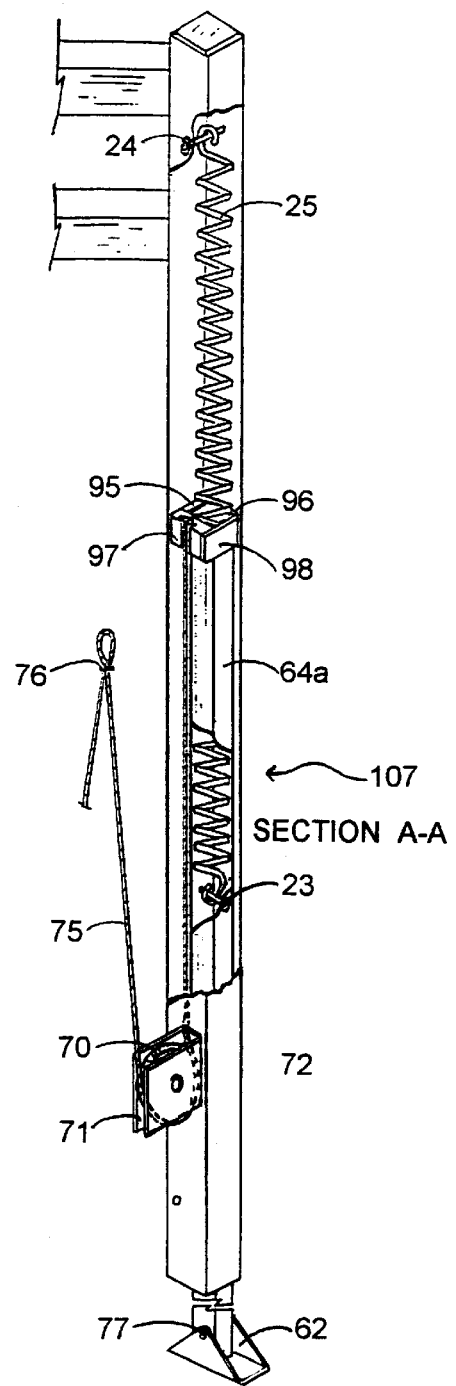
FIG. 1A is an enlarged sectional view of section AA FIG. 1 showing various assembly and internal aspects.

The cable 75 is routed under a elevator pulley 70 FIG. 1A and FIG. 11 consisting of a pulley approximately 5 cm diameter×1.5 cm wide on each side, being attached by a elevator pulley pin 72 FIG. 1A and FIG. 11 consisting of a steel pin approximately 9.4 mm diameter×2.5 cm long to a elevator pulley bracket 71 FIG. 1A consisting of two steel plates approximately 3 mm thick×5 cm square extending from rail 22a and rail 22b. Cable 75 rout continues up along the inner walls of rail 22a and rail 22b where cable 75 is connected to the top of a left inner rail 64a FIG. 14C and FIG. 14D consisting of tubing 19 mm square having a rail shim back 95 consisting of steel 10.1 thick×10 mm×18.5 mm connected to the back side 3 mm from the top horizontally centered. A rail shim outer 96 consisting of steel 4.8 mm thick×10 mm×25 mm is connected horizontally to the right side 3 mm from the top offset 4 mm toward shim 95. A rail shim slotted 97 consisting of steel 10.1 thick×10 mm×25 mm having a vertical slot 5 mm wide×7 mm deep centered on rail 64a is connected horizontally with slot facing out to the left side 3 mm from the top offset 4 mm toward shim 95. A rail shim front 98 consisting of steel 4.8 mm thick×10 mm×25 mm is connected to the front side 3 mm from the top horizontally offset 4 mm toward shim 97. Having a 6 mm diameter hole centered through rail 64a 300 mm from the top, being parallel to shim 96. Having a 8 mm hole centered through rail 64a 10 mm from the bottom parallel to shim 98. Having cable 75 connected to the top of a right inner rail 64b consisting of a mirrored 64a both shown partially extended from inside rail 22a and rail 22b.

A top spring pin 24 FIG. 1A consisting of a steel pin approximately 46 mm long×6 mm diameter attaching a elevator return spring 25 FIG. 1A consisting of an expansible coil spring having a diameter small enough to fit inside the left inner rail 64a and the right rail 64b to rail 22a and rail 22b. Having a bottom spring pin 23 FIG. 1A consisting of a steel pin approximately 19 mm long×6 mm diameter attaching the spring 25 to the inside of left inner rail 64a and the right rail 64b. A foot 62 FIG. 1A consisting of steel 2 mm thick forming a channel having chamfered sides is attached with a foot pin 77 consisting of a 8 mm steel pin long enough to fit through the foot to each of the bottoms of left inner rail 64a and the right rail 64b. A base pin 48 FIG. 6 consisting of steel approximately 9.4 mm diameter×6.5 cm long, is used on each side to attach the base 66c to a transverse pickup lip attachment 104 FIG. 12 Consisting of a lip plate 100 Consisting of a steel plate 4 mm thick×380 mm×150 mm having 50 mm chamfers on two corners 280 mm apart.

Having of a angle bar 110 Consisting of 3 mm thick 45 mm angle steel connected to the unchamfered side of plate 100. Having of a riser bar 103 consisting of a steel bar 7 mm thick×37 mm×100 mm connected vertically to each end of bar 110. Having a mount bar 102 consisting of square tubing×38 mm×38 mm×70 mm long, having a 9.4 mm hole through two walls centered 15 mm from one end. Having bar 102 connected to the top of each riser bar 103. Pin 48 on the far side is not seen in this view.

Figure 2:
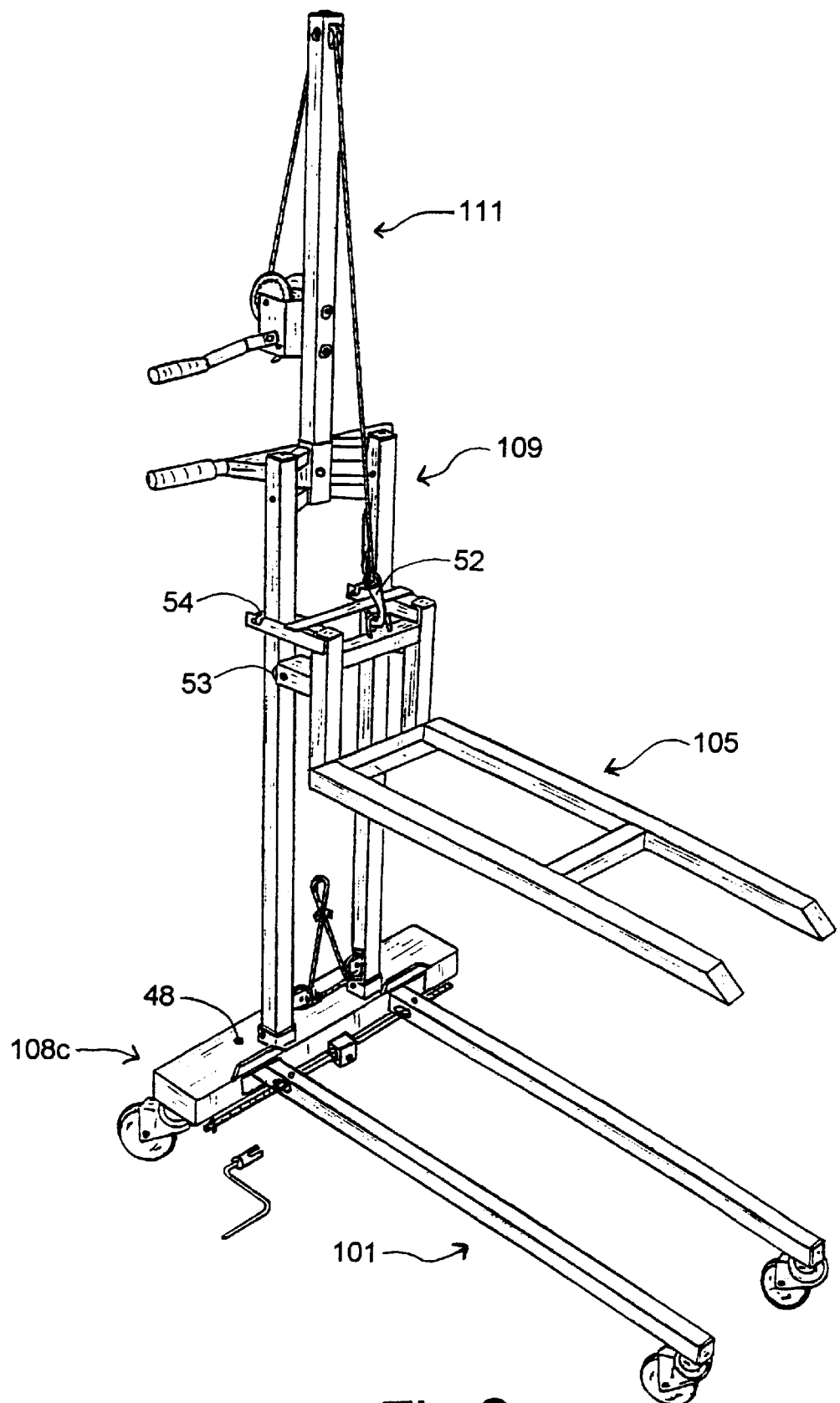
FIG. 2 shows a perspective view of a possible configuration of the hand-truck attachments.

FIG. 2 is a perspective view of the device in FIG. 1. Having replaced attachment 104 FIG. 12 with a divergent leg attachment 101 FIG. 9 and FIG. 9A consisting of a right horizontally extended rail 42a consisting of steel tubing approximately 2 mm thick 38 mm square×122 cm long. Approximately 25 mm from one end in the center of the rail is a hole approximately 9.4 mm diameter in line through both upper and lower walls. Approximately 20 cm from the same end in the center of the rail is a hole approximately 6 mm diameter in line through both upper and lower walls. Centered in each side of the tubing is a slot approximately 16 mm wide×50 mm long. When rail 42a and rail 42b are parallel the inner slot has one end in line with the hole in the with rest of the slot being toward the near end of the tubing. The outer slot has one end in line with the hole in the with rest of the slot being toward the far end of the tubing. A mount plate 81 consisting of steel approximately 6 mm thick×38 mm square is attached to the bottom of rail 42a providing a reinforced area to which is attached a caster assembly 50 FIG. 9B consisting of a wheel 65a attached to a bracket 65c.

A left horizontally extended rail 42b consisting of a mirror of rail 42a having assembly 50 attached to plate 81. A LH thread adjustment nut 47a consisting of steel approximately 25 mm diameter×34 mm long having a left hand threaded hole approximately 13 mm diameter perpendicular to the diameter and centered between the ends each end having a threaded hole approximately 10 mm deep.

A RH thread adjustment nut 47b consisting of steel approximately 25 mm diameter×34 mm long having a right hand threaded hole centered through the diameter and centered between the ends each end having a threaded hole approximately 10 mm deep. A lead screw 43 consisting of steel approximately 66 cm long 17 mm diameter in the center having left hand threads approximately 13 mm diameter×127 mm long on one end. The opposite end having right hand threads approximately 13 mm diameter×200 mm long, having approximately 11 mm diameter for 25 mm to said end. Having an approximately 5 mm diameter hole through approximately 18 mm from said end.

A case 45 consisting of steel tubing approximately 32 mm square×50 mm long×3 mm wall. Having an upper hole approximately 17 mm diameter through both walls, having a lower hole approximately 9 mm diameter through both walls on the opposite sides. A stabilizer pin 46a consisting of steel approximately 9 mm diameter×100 mm long, having one end threaded approximately 20 mm. A lock nut 46b consisting of a steel hexagon internally threaded nut. A collar 44 consisting of a steel ring approximately 12 mm wide×6 mm wall having an internal diameter that slips over the largest Diameter of screw 43. A set screw 44a consisting of a steel set screw holds collar 44 in place. A lock screw 60 consisting of a steel self locking screw fits through holes in the top and bottom of rail 42a and rail 42b and is threaded into nut 47a and nut 47b. A crank stop pin 49 consisting of a steel pin having an approximately 5 mm diameter×25 mm long fits through screw 43. A lead screw crank 49a consisting of a steel rod approximately 8 mm diameter bent to form a crank shape connected to a steel rod approximately 20 mm diameter having a hole that will slip over the 11 mm diameter of screw 43. Said 20 mm diameter rod having two slot approximately 5 mm wide×10 mm long from the end on center line fits over pin 49.

Having attachment 101 connecting to a base attachment caster 108c FIG. 6 and FIG. 6A. Consisting of a base 66c having base support 67 consisting of steel 6 mm×25 mm×100 mm long is attached above and below each 100 mm long slot. Having a vertical slot 121 consisting of a slot 9.5 mm×12 mm long horizontally centered and 10 mm from the bottom through the back wall of body 66c. Having in the top wall between the 100 mm long slots in two places parallel rail support 68 is attached to the inside of the bottom of base 108c and protrudes through a hole in the top of base 108c. Having a pin 69 through each rail support 68. Having end plate 63c attached to each end of base 108c. Having a caster assembly 50 FIG. 9B a bracket 65c a wheel 65a attached to each bracket 65c is attached to the bottom of base 108c near each end with pin 48.

Having a load supporting mechanism 105 FIG. 13 and FIG. 13A consisting of a connected rail 89 consisting of tubing Approximately 38 mm square×92 cm long having a 35 mm chamfer on the top side of one end. A slide plate 84 consisting of 2 mm thick steel covers the chamfer. A lower crossmember 83 consisting of tubing approximately 38 mm square×23 cm long is connected between each rail 89 aligned horizontally and parallel. A angle bar 82 consisting of 38 mm angle stock of sufficient length to reach the outer sides of each rail 89 connecting each rail 89 on the square end. Having the inside wall of bar 82 located under rail 89. A riser 93 consisting of tubing approximately 38 mm square×28 cm long is connected vertically to bar 82 20 mm from each end. A upper crossmember 85 consisting of tubing approximately 38 mm square×23cm long having two centered 8 mm through holes is connected between and 38 mm below the top each riser 93.

A right roller bracket 87 consisting of a steel bar 6 mm thick×25 mm×22 cm having a centered horizontal slot 8 mm×25 mm beginning 10 mm from the end. Said slot is intersected 31 mm from the end by a vertical 8 mm slot creating an opening in the top. Said steel bar is formed with two bends of the 6 mm wall the first bend being 100 mm the second bend being 150 mm from said slotted end, creating 10 mm offset parallel planes at each end. A left roller bracket 88 consisting of a mirrored image of bracket 87. Connecting the unslotted ends of bracket 88 and bracket 87 horizontally above crossmember 85 to the tops of the inner and outer walls of each riser 93 in a manner providing a wider space between the slotted ends and having a narrower space at the said unslotted ends having the slotted ends opposite rail 89.

A upper support 86 consisting of a steel bar 5 mm wall×25 mm×290 mm is attached to bracket 88 and bracket 87 above the bent sections. A roller case 94 Consisting of 2.5 mm thick walls rectangular tubing 44 mm×70 mm×76 mm long having a 8 mm diameter hole 12 mm from the open end in line centered through two 44 mm sides. Having one 70 mm side relieved back 50 mm from the end below said 8 mm hole. Case 94 is attached to each riser 93 75 mm below bracket 88 and bracket 87. A guide roller unit 53 FIG. 13G (top view) and FIG. 13H (end view) consisting of plasticized material 50 mm diameter×50 mm long having a 33 mm diameter×35 mm long centered. Having 7.5 mm thick×8.5 mm high flanges on each end, and having a 8 mm hole through the axis is connected in each case 94 by a roller bolt 91 FIG. 13E consisting of a 8 mm bolt×76 mm long and a roller nut 92 FIG. 13F consisting of a 8 mm locking nut. A u-bolt 55 consisting of a 8 mm diameter u-bolt is attached to crossmember 85.

A attaching roller unit 54 FIG. 13C and FIG. 13D consisting of plasticized material 50 mm diameter×50 mm long having a 33 mm diameter×35 mm long centered, having 7.5 mm thick×8.5 mm high flanges on each end, and having a 8 mm steel shaft protruding 10 mm from the axis on each end.

Having load supporting mechanism 105 shown partially elevated connected to unit 109 FIG. 11 consisting of a right longitudinally extended rail 22a connected to cross bar 26 two places on one side. Each bar 26 is connected to a vertical extension guide 31. Bar 26 is connected two the opposite side of guide 31 in two places. Each bar 26 is connected a left longitudinally extended rail 22b. Handle unit 99 FIG. 15 is connected to a rail 22a and a rail 22b. A elevating mechanism assembly 107 FIG. 1A consisting of the following items. Having pin 24 attaching spring 25 to the inside of rail 64a and rail 64b to rail 22a and rail 22b shown in FIG. 1. Having pin 23 attaching the spring 25 to the inside rail 64a and rail 64b. Having pin 77 attaching foot 62 to each of the bottoms of rail 64a rail 64b. Having cable 75 connected to the top of rail 64a Having cable 75 FIG. 11 routed under pulley 70 being attached by pin 72 to bracket 71 extending from rail 22a and rail 22b shown in FIG. 11. The cable 75 rout continuing up along the inner walls of rail 22a and rail 22b where cable 75 connects to the tops of rail 64a and rail 64b. Having clamp 76 connected to cable 75 forming a loop between rail 64a and rail 64b. is contained in rail 22a and rail 22b. Assembly 107 is always included as part of unit 109. FIG. 11 on each side by roller unit 53 FIG. 13A and FIG. 13G and FIG. 13H and attaching roller unit 54 FIG. 13A and FIG. 13C and FIG. 13D. Having hook 52 FIG. 10 connected to u-bolt 55 FIG. 13.

Figure 3:
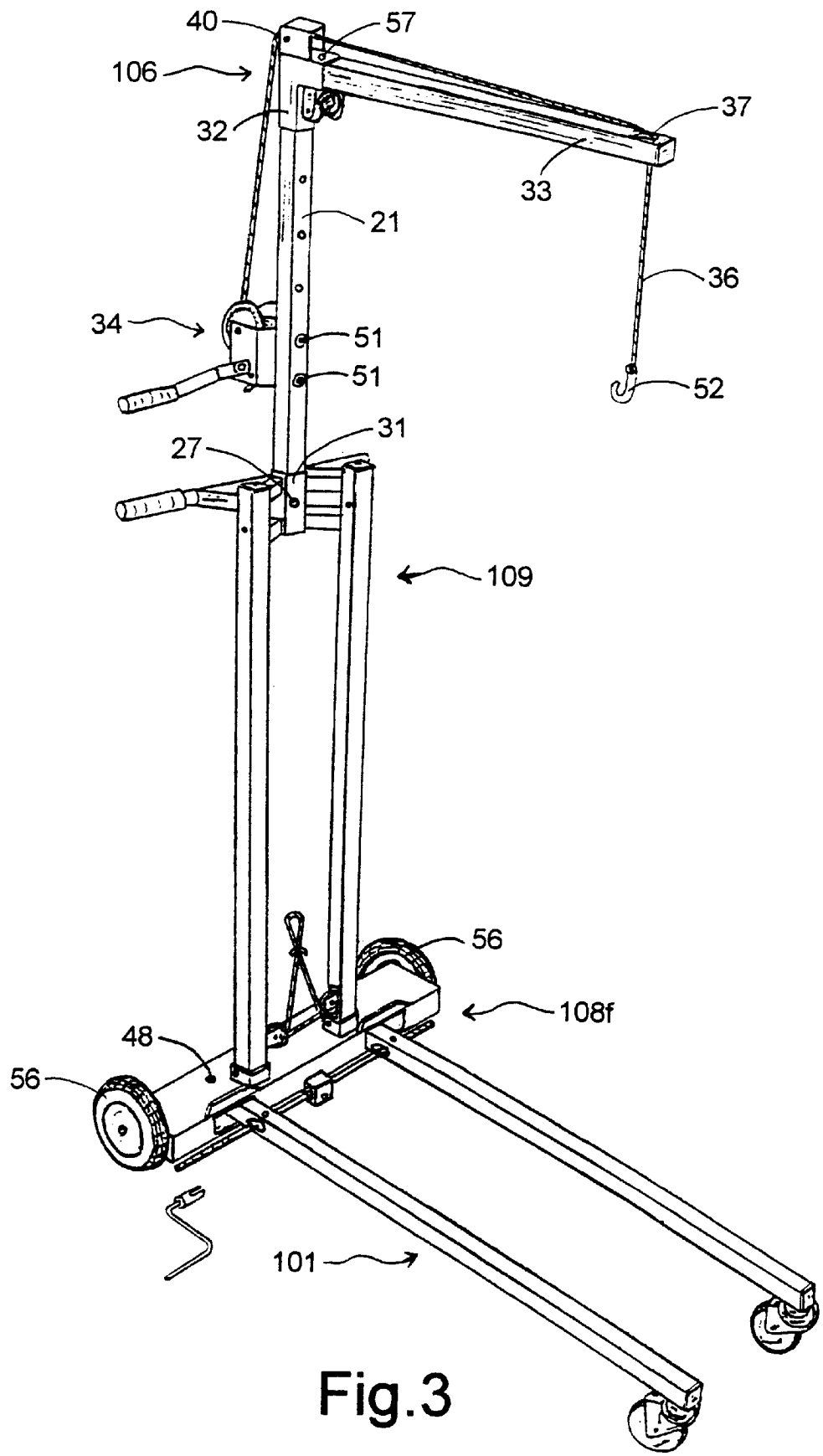
FIG. 3 shows a perspective view of a possible configuration of the hand-truck attachments.
Figure 5:
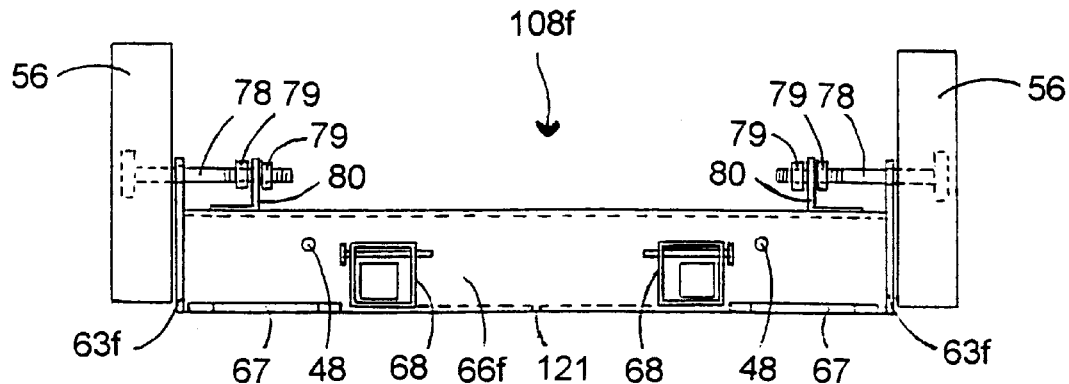
FIG. 5 shows an engineering drawing (top view) a base attachment having fixed position rotatable wheels.
Figure 12:
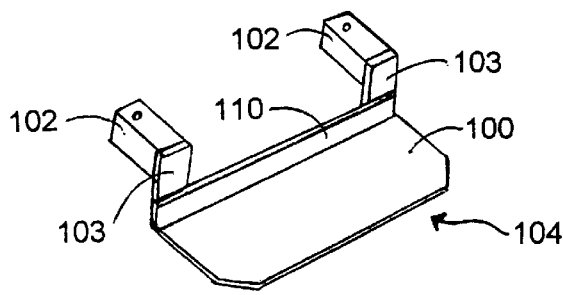
FIG. 12 shows a perspective view of a transverse pick-up lip attachment.

FIG. 3 is a perspective view of the device in FIG. 1 Having replaced attachment 104 FIG. 12 with attachment 101 FIG. 9 connected to a base attachment fixed 108f FIG. 5. Consisting of a base body 66f fixed consisting of rectangular tubing of approximately 2.5 mm wall thickness 5.08 cm×10.16 cm×51 cm long. Having 48.3 mm×100 mm long slots through the front 5.08 cm wall 10 mm from each end. Having a vertical slot 121 horizontally centered and 10 mm from the bottom through the back wall of body 66f. Having base support 67 attached above and below each 100 mm long slot. Having parallel rail support 68 FIG. 6 attached to the inside of the bottom of body 66f and protrudes through a hole in the top of body 66f. Having a pin 69 through each rail support 68. A end plate fixed 63f consisting of a steel plate 5 mm thick having a 12.7 mm hole through one end large enough to cover the end of body 66f and extend 50 mm beyond the back side is attached to each end of body 66f. A plate 80 consisting of 38 mm angle steel 4.8 mm thick×50 mm long having a 12.7 mm hole through one side is attached to the back of body 66f. In two places a rotatable wheel 56 consisting of a wheel 37 mm wide×200 mm diameter is attached to end plate 63f and plate 80 by a bolt 78 consisting of a 12.7 mm diameter bolt through and secured to each plate 80 on each side totaling four places with a nut 79 consisting of a threaded nut. with pin 48 FIG. 6. Having a rotatable wheel 56 FIG. 5 is attached at each end of the body 66f.

Having rail 33 FIG. 10 replaced by a vertical rail 21 consisting of tubing with a hole pattern is inserted into a vertical extension guide 31 FIG. 11 and held in place by an extension pin 27 FIG. 11. Having assembly 106 FIG. 7 and FIG. 7A and FIG. 7B consisting of horizontal boom support 32 consisting of two pieces tubing connected at approximately a 100 degree angle. Having a top hoist pulley bracket 39 consisting of steel channel having a hole centered through the parallel sides 15 mm from one end. Having bracket 39 attached by the open channel side to the top of support 32. Having a top hoist pulley 40 consisting of a plasticized material 36 mm diameter×38 mm long having an relieved center diameter 30 mm×30 mm long forming 3 mm high×4 mm wide flanges on each end. Having a 9.4 mm diameter hole through the axis. Having pulley 40 contained in bracket 39 and secured in place with a pin 41 consisting of a steel pin 9.4 mm diameter×50 mm long. Having a bottom hoist pulley bracket 39b consisting of steel channel having a hole centered through the parallel sides 15 mm from one end connected to the underside of the top tube of support 32 with channel opening out.

A bottom hoist pulley 40b consisting of a plasticized material 36 mm diameter×38 mm long having an relieved center diameter 30 mm×30 mm long forming 3 mm high×4 mm wide flanges on each end. Having a 9.4 mm diameter hole through the axis. having pulley 40b contained in bracket 39b and secured in place with pin 41. said assembly 106 is attached to the top of rail 21. Having rail 33 inserted into support 32 FIG. 7 and held in place by a boom pin 57 FIG. 7 consisting of steel approximately 9.4 mm diameter×5 cm long. Having winch unit 34 FIG. 16 attached to rail 21 using a threaded knob 51 FIG. 10 two places. Having line 36 extended up and over a pulley 40 above the rail 33 connected to hook 52 and over pulley 37 FIG. 10 through a slot in rail 33, where it hangs.

Figure 4:
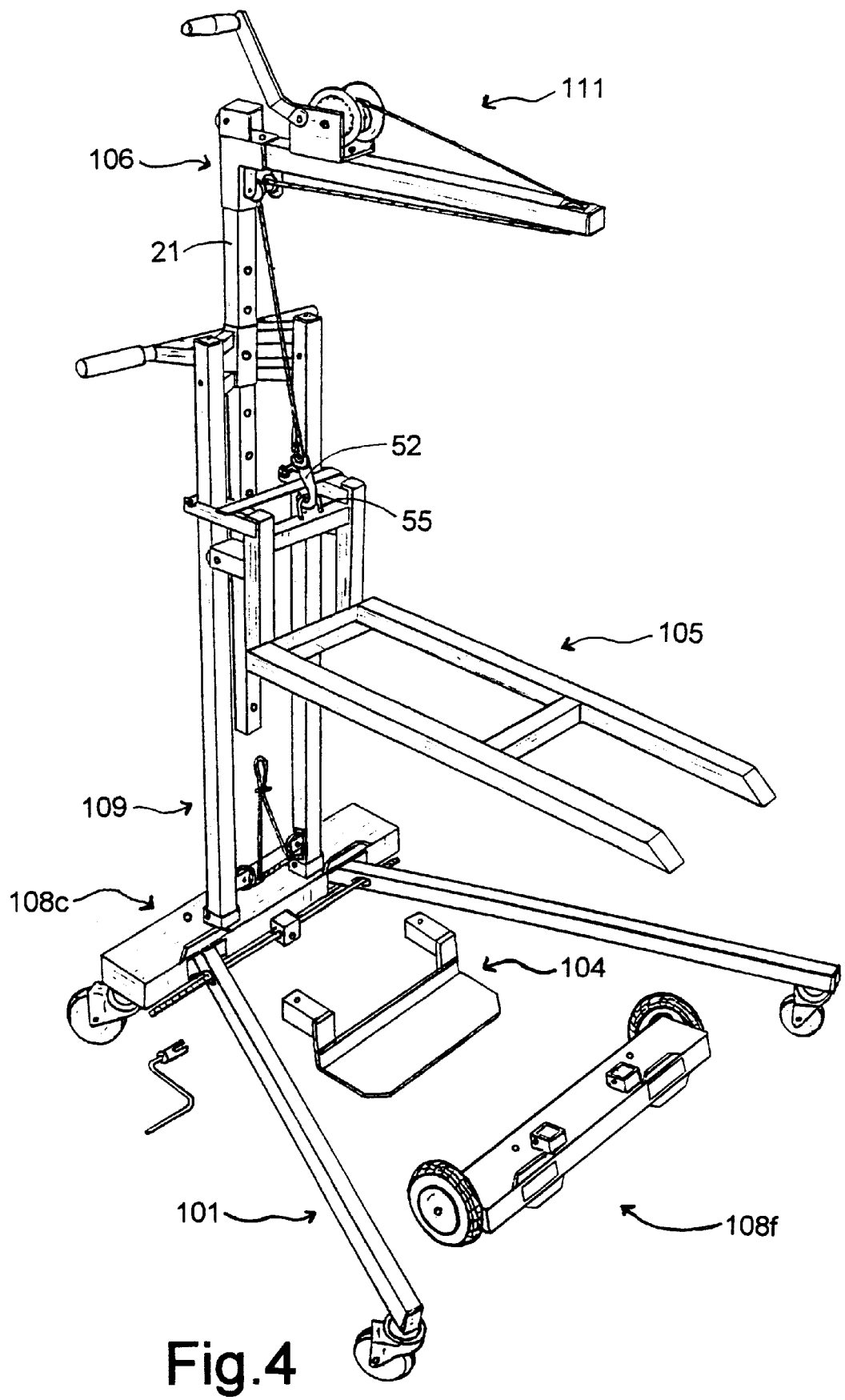
FIG. 4 shows a perspective view of a possible configuration of the hand-truck attachments, also shows remaining attachments separately.

FIG. 4 is a perspective view of the present invention, Having attachment 101 FIG. 9 connected to base attachment 108c FIG. 6. Having body unit 109 FIG. 11 connected to base attachment 108c. Having load supporting mechanism 105 FIG. 13 connected to body unit 109 FIG. 11. Having vertical rail 21 FIG. 3 connected to body unit 109. Having a support assembly 106 FIG. 7 connected to vertical rail 21 FIG. 2.

Having load lifting mechanism 111 FIG. 10 consisting of. A winch unit 34 FIG. 16 attached to the rail 33 using a threaded knob 51 two places. A pulley 37 is attached in a slot through rail 33 using a boom pin 38. Line 36 is extended from winch 34 over pulley 37 then down through rail 33 over pulley 40b. Having hook 52 attached to the end of line 36. Having hook 52 connected to u-bolt 55 FIG. 13. Shown separately is the pick-up lip attachment 104 FIG. 12, and the base 108f FIG. 5.

Operations—FIGS. 1,2,3,4

The common two-wheeled hand-truck is used extensively to handle heavy, rigid, box-like loads. My invention is essentially conventional when assembled using the following four components, a body unit 109 FIG. 11 always including elevating mechanism 107, a transverse pickup lip attachment 104 FIG. 12. A base attachment fixed 108f FIG. 5 and FIG. 3, having a base attachment caster 108c FIG. 1 and FIG. 6 and FIG. 6A interchangeable with 108f because when a positional bracket 65c is locked into position it cannot rotate, thereby ground engaging wheel 65a preforms essentially the same function as a rotatable wheel 56 FIG. 5.

The manner of using the hand-truck with attachments as embodied in FIG. 1. This embodiment is comprised of a body 109 FIG. 11, a base 108c FIG. 6, a load lifting mechanism 111 FIG. 10. A flat fabric strap is preferred to a line 36. A round cable is shown in the figures to provide greater clarity. A lip 104 FIG. 12, and a pin 27 are also shown.

The following procedure is used to assemble the embodiment shown in FIG. 1, using attachments. From the body 109 FIG. 11 remove each pin 77 and each foot 62 from the right rail 64b and from a left inner rail 64a. Insert the left rail 64a and the right rail 64b through the clearance holes provided in a base 108c FIG. 6 base 108f FIG. 5 is interchangeable with base 108 c FIG. 6 Insert each rail 22a and rail 22b into a support 68 provided for each in the base 108c. Insert pin 69 through each support 68. With a pin 77 through each attach a foot 62 to the left rail 64a and a foot 62 the right rail 64b.

Insert lip 104 FIG. 12 into the slots provided in the base 108c. Attach lip 104 FIG. 12 to base 108c FIG. 6 with a base pin 48 two places, one pin 48 is hidden behind the rail 22a is not shown in this view. Insert mechanism 111 FIG. 10 into guide 31, and attach mechanism 111 to guide 31 with pin 27.

This embodiment while capable of preforming all of the functions of a common hand-truck, has the added advantage of a pair of downwardly extendable elevator legs. Having a left rail 64*a* and a right rail 64*b* forming part of an elevating mechanism that is provided to raise and lower the hand-truck. In the preferred embodiment, the elevating legs are housed in rail 22*a* and rail 22*b,* to telescopically extend therefrom. A cable 75 is attached to the tops of the right rail 64*b* and left rail 64*a* and routed down along the side of each continuing under a pulley 70 attached to each rail 22*a* and rail 22*b*. The cable 75 is long enough to reach approximately 35 cm above the pulley 70, with the left rail 64*a* and the right rail 64*b* in the retracted position. A clamp 73 FIG. 11A and FIG. 11B attaches a cable 74 to cable 75 in two places, cable 74 limits the travel of cable 75 keeping it taught and securing it within the groves of each pulley 70 FIG. 11. A clamp 76 is clamped to cable 75 forming a loop in the center of 75. The function of the heretofore mentioned cable 75 being long enough to reach approximately 35 cm above the pulley 70, is the cable 75 does not begin to pull on the left rail 64*a* and the right rail 64*b* until the acute angle between cable 75 and a straight line drawn from pulley 70 to pulley 37 is reduced to a very small angle less than 5 degrees. Therefore causing the cable 75 and the line 36, to be almost in straight lines between pulley 37 and cable 75. This cable arrangement causes left rail 64*a* and the right rail 64*b* to be extended almost in unison, when urged by actuating the winch 34. Beginning with less than 1.5 cm variation diminishing to less than 10 mm as the left rail 64*a* and the right rail 64*b* are extended farther, thus making any structure such as a crossbar between the left rail 64*a* and the right rail 64*b* unnecessary for stable operation when raising or lowering the hand-truck by extending the left rail 64*a* and the right rail 64*b*. The heretofore function may be referred to as the elevating mechanism.

To pickup a load with my invention the following procedure is suggested. First hold the grip 30, slide protruding lip portion of the lip attachment 104 under the object the to be moved, and against rail 22*a* and rail 22*b*. The object can be secured to rail 22*a* and rail 22*b* with a strap, rope, chain, etc. if desired, or held against them with first hand while holding the a handle unit 29 with the second hand. Tilt the hand-truck and the object back toward the operator until the load is balanced over the wheels, the object will stay on the hand-truck in this position freeing the first hand to hold the handle 29. Roll the hand-truck and the object to a desired location.

The following example is one method of using the elevating mechanism to climb stair steps. Roll the hand-truck and the object near the bottom step, the operator first climbs the first two or three steps. Hold the handle 29 pull the hand-truck toward the bottom step until each wheel 65*a* stops against the bottom step. Move the left hand near the center of the handle 29 while holding handle 29 the right hand. With the right hand grasp a winch-handle 34*a*, the hand-truck and load can be moved to a selected elevated position by actuating a winch handle 34*a*. Elevate the hand-tuck so that the wheels 65*a* are higher than the first step, then tilt the hand-truck back so the wheels 65*a* will set on the first step when lowered. Actuate the winch-handle 34*a* in the opposite direction retracting the elevating mechanism and lowering wheels 65*a* to the top of the first step. With the second hand continue retracting the elevating mechanism. Repeat the heretofore process for each stair step. Reverse the heretofore procedures to unload the object or to go down stair steps.

The manner of using the hand-truck with attachments as embodied in FIG. 2. This embodiment is comprised of a body unit 109 FIG. 11, a base attachment caster 108*c* FIG. 6, a load lifting mechanism 111 FIG. 10, a divergent leg attachment 101 FIG. 9, a load supporting mechanism 105 FIG. 13.

The following procedure is used to assemble the embodiment shown in FIG. 2 using attachments. Follow the procedure heretofore described to assemble FIG. 1, with the following variations. Replace the lip attachment 104 FIG. 12, with a leg attachment 101 FIG. 9 and FIG. 9A. A right rail 42*a* and a left rail 42*b* can be urged to move apart, starting from a parallel arrangement opening up to form a 90 degree included angle between them. Both the right rail 42*a* and left rail 42*b* have a slot through each side to allow a lead screw 43 to fit through it. Attached inside each right rail 42*a* and left rail 42*b* on the top and on the bottom by a lock screw 60, is a RH thread adjust nut 47*b* or a LH thread adjust nut 47*a*, having the lead screw 43 threaded through it.

A case unit 45*a* has a hole through two sides allowing the lead screw 43 to slip fit through it. A set screw 44*a* attaches a collar 44 witch fits around the lead screw 43, on each side of the case unit 45*a* preventing it from moving laterally on the lead screw 43. A stabilizer pin 46*a* protruding from the case unit 45*a* slip fits into a vertical slot provided in the base 108*c*. By rotating the lead screw crank 43*a* which turns the lead screw 43 threaded through a RH nut 47*b* and a nut 47*a*, the distance between RH nut 47*b* and a nut 47*a*, is increased or decreased urging the right rail 42*a* and a left rail 42*b* to change position. A pin 48 that attaches RH nut 47*b* and a nut 47*a* to the base 108*c* also provides a pivot point for RH nut 47*b* and a nut 47*a*. The lateral movement of RH nut 47*b* and a nut 47*a*. relative to the base 108*c* is kept equal by pin 46*a*.

Attach a supporting mechanism 105 FIG. 13 by placing a guide roller unit 53 against the front of each rail 22*a* and rail 22*b*. Then tilt supporting mechanism 105 so that a attaching roller unit 54 can be placed in the each slot provided in supporting mechanism 105, allow each roller 54 to rest against the back of rail 22*a* and rail 22*b*. Attach a hook 52 to a u-bolt 55. The supporting mechanism 105 can now be raised until the roller 54 reaches a cross bar 26 and lowered between the right rail 42*a* and a left rail 42*b* to set on the ground.

The following example is one method of using the embodiment shown in FIG. 2. Rotate the crank 43*a*, to separate the right rail 42*a* and a left rail 42*b* far enough apart to allow the supporting mechanism 105 and the object that is to be lifted to fit between them. Crank the winch handle 34*a* to lower the supporting mechanism 105 to the ground, slide the object on to the supporting mechanism 105, crank the winch handle 34*a* to raise the supporting mechanism 105 and the object to a desired height. The heretofore function may be referred to as a lifting mechanism. The hand-truck and the object can be rolled to a desired location. A bracket 65*c* on each side can be unlocked to make navigating in confined quarters easier. To unload the object slide it off supporting mechanism 105. To lower an object, reverse the heretofore process. Rotating the crank 43*a* can narrow or widen the distance between right rail 42*a* and a left rail 42*b* while supporting mechanism 105 is supporting a load.

The elevating mechanism can be used with this embodiment by placing a board or similar object across the right rail 42*a* and the left rail 42*b*. Actuate the winch handle 34*a* to lower supporting mechanism 105 until it rest on the board. Disconnect a hook 52 from the u-bolt 55, and connect the hook 52 to the cable 75. Use the procedure to elevate heretofore described for FIG. 1.

The manner of using the hand-truck with attachments as embodied in FIG. 3. This embodiment is comprised of a body unit 109 FIG. 11, a base attachment fixed 108*f* FIG. 5 is shown a base 108*c* FIG. 6 is interchangeable with 108*f*, a mechanism 111 FIG. 10, a divergent leg attachment 101

FIG. 9, a vertical rail 21, a boom support assembly 106 FIG. 7, a winch unit 34, a line 36, a hook 52, a boom pin 57, a threaded knob 51 two places.

The following procedure is used to assemble the embodiment shown in FIG. 3 using attachments. Follow the procedure heretofore described to assemble FIG. 2, with the following variations. A supporting mechanism 105 FIG. 13 is not used, a rail 21 is slipped into a guide 31 and attached with a pin 27 a boom support 106 FIG. 7 slipped over the top of the rail 21 a mechanism 111 FIG. 10 is slipped into the boom support 106 FIG. 7 and attached with a boom pin 57. A winch 34 is removed from mechanism 111 and attached to the rail 21 with a knob 51 two places. From the winch 34 rout a line 36 over a pulley 40 FIG. 7, along a rail 33 over a pulley 37 through rail 33 to hang, ready for use.

The following example is one method of using the embodiment shown in FIG. 3. A right rail 42a and a left rail 42b can be used as heretofore described in FIG. 2. A rail 21 can be set to various heights by placing a pin 27 in different holes provided in rail 21. This arrangement allows the mechanism 111, to have a low setting of approximately 120 cm and a high setting of approximately 240 cm in increments of approximately 20 cm. A winch 34 can be set to various heights by different holes provided in rail 21, each height setting for the mechanism 111 has a corresponding height setting for the winch 34, this allows the operator to maintain a convenient cranking height with the mechanism 111 at various settings.

To lift an object choose an appropriate height for mechanism 111. For example, a lower setting would be used to set an object in to a van or a car trunk, a higher setting would be used to reach a high shelf or to stack objects. To lift an object it must have a means to which the hook may be attached. For example, have an eye, or be tied by a rope or chain, in a net, or various other holding devices. To lift an object from the ground attach a hook 52 to the object. Actuate the winch 34 lift the object high enough so that the right rail 42a and the left rail 42b can be positioned under the object, if necessary a board or similar item can be placed across them providing a platform to set the object. Actuate 34 to lower the object and set it on the right rail 42a and the left rail 42b. The heretofore function may be referred to as a hoisting mechanism. The hand-truck and the object can be rolled to a desired location. To connect the elevating mechanism disconnect the hook 52 from the object, and rout the line 36 over the pulley 40b FIG. 7 and attach the hook 52 to the cable 75. The elevating mechanism can be used with this embodiment by following the procedure heretofore in FIG. 2. To unload the object, reverse the heretofore lift procedure.

Summary, Ramifications, and Scope

Accordingly, the reader will see that the hand-truck with attachments of this invention can be used to lift, hoist, and transport objects, is very maneuverable, and is able to make elevation changes. By applying the mechanical advantage of a winch it is possible to perform these functions without requiring the operator to exert much physical effort, and can be used by persons of almost any size or age. Providing one person with the ability to perform task that would otherwise require assistance from others. Because the hand-truck can use many of the same attachments in a variety of easily assembled embodiments, it provides a low maintenance, highly reliable, easy to use, light weight, multipurpose, and economical device, that requires little storage space. Furthermore, the hand-truck has additional advantages in that it can be used with the caster wheels embodiment, or with the rotatable wheels embodiment;

the caster wheels provide good agility for operation in places such as, doorways and hallways;

the rotatable wheels provide the use of a large enough wheel to operate in terrain such as, on grass, in a garden, in gravel, or other rough surfaces;

It can be transported unassembled to save space and quickly assembled to a desired embodiment at the site of usage.

Although the above description above contains many specificities, these should not be construed as limitations on the scope of the invention but as merely providing illustrations of some of the presently preferred embodiments of this invention. For example, the hand-truck can be made from other materials, such as aluminum, various metals, polyethylene, polypropylene, various impregnated or laminated fibrous materials, various plasticized materials, etc. The wall thickness of the tubing can be changed. The size of the components can be changed.

Thus the scope of the invention should be determined by the appended claims and their legal equivalents, rather than by the examples given.

I claim:

1. A hand-truck apparatus for elevating and transporting an object comprising a body unit including a handle unit attached to a plurality of longitudinally extended rails attached to a base having a plurality of ground engaging wheels, a plurality of horizontally extended rails outstanding from a front edge of said base having a plurality of directionally positionable wheels attached to said horizontally extended rails, said base, said logitudinally extended rails, and said horizontally extended rails arranged in a manner which permits the object to set on said horizontally extended rails and lie against a front side of said body unit when the hand-truck apparatus is tipped rearward onto said ground engaging wheels, an elevating mechanism for lifting and lowering a load supporting mechanism movably mounted on the front of said body unit, a vertical rail attached to said body unit, and an attachable rail extending horizontally over said horizontally extended rails mounted on said vertical rail.

2. A hand-truck apparatus according to claim 1 wherein said elevating means includes a winch unit, a pulley and a cable attached to said vertical rail or said attachable rail.

3. A hand-truck apparatus according to claim 1 wherein said ground engaging wheels include a pair of spaced apart wheels.

4. A hand-truck apparatus according to claim 1 wherein said horizontally extended rails are attached to said base in a manner permitting a range of movement from parallel to divergent positioning.

5. A hand-truck apparatus according to claim 1 wherein said positionable wheels each include a caster assembly attached near a distal end of said horizontally extended rails and are ground engaging.

6. A hand-truck apparatus according to claim 1 further including means of spreading and closing said horizontally extended rails.

7. A hand-truck apparatus according to claim 6 wherein said means of spreading and closing includes a threaded mechanism attached between said horizontally extended rails near said base.

8. A hand-truck apparatus according to claim 1 wherein said elevating mechanism includes a pair of inner rails telescopically carried in said body unit.

9. A hand-truck apparatus according to claim 8 wherein said inner rails include linkage for moving said inner rails telescopically.

10. A hand-truck apparatus according to claim 8 wherein said inner rails include linkage for connecting said inner rails together.

11. A hand-truck apparatus according to claim 10 wherein said inner rails include means for extending and retracting a substantial portion of said inner rails to raise and lower the hand-truck apparatus thereon.

12. A hand-truck apparatus according to claim 1 wherein said load supporting mechanism includes a plurality of generally horizontally extended connected rails of a predetermined length to support a load.

13. A hand-truck apparatus according to claim 1 wherein said load supporting mechanism is movable between a lower position and an upper position.

14. A hand-truck apparatus according to claim 1 wherein said load supporting mechanism includes means for being moved between a lower position and an upper position.

15. A hand-truck apparatus according to claim 1 wherein said vertical rail is movable between a first lower position and a second upper position.

16. A hand-truck apparatus according to claim 1 wherein said attachable rail includes means for raising and lowering a load.

\* \* \* \* \*